United States Patent
Caulkins

(10) Patent No.: US 8,086,795 B2
(45) Date of Patent: Dec. 27, 2011

(54) ONBOARD COMPUTER DATA STORAGE, ACCESS, AND CACHING SYSTEM

(75) Inventor: Jason Caulkins, West Windsor, NJ (US)

(73) Assignee: Dataram, Inc., West Windsor, NJ (US)

( * ) Notice: Subject to any disclaimer, the term of this patent is extended or adjusted under 35 U.S.C. 154(b) by 520 days.

(21) Appl. No.: 12/356,238

(22) Filed: Jan. 20, 2009

(65) Prior Publication Data

US 2010/0185815 A1 Jul. 22, 2010

(51) Int. Cl.
  *G06F 13/00* (2006.01)
  *G06F 13/28* (2006.01)
  *G06F 3/00* (2006.01)
(52) U.S. Cl. ............ 711/114; 711/117; 711/E12.019; 710/8
(58) Field of Classification Search .......... 711/114, 711/117, E12.019; 710/8
See application file for complete search history.

(56) References Cited

U.S. PATENT DOCUMENTS

| | | | | |
|---|---|---|---|---|
| 5,586,291 | A * | 12/1996 | Lasker et al. | 711/113 |
| 7,114,117 | B2 * | 9/2006 | Tamura et al. | 714/763 |
| 2005/0283655 | A1 * | 12/2005 | Ashmore | 714/7 |
| 2008/0256316 | A1 * | 10/2008 | Evanchik et al. | 711/162 |

* cited by examiner

Primary Examiner — Edward Dudek, Jr.
(74) Attorney, Agent, or Firm — Donald R. Boys; Central Coast Patent Agency, Inc.

(57) ABSTRACT

A controller and memory unit for a host computer has a primary controller coupled to a parallel bus interface connectable or connected to the host computer, and by cable connections to one or more remote memory disk units, one or more secondary controllers coupled by parallel bus to the primary controller, and one or more solid-state memory modules coupled by parallel bus one-to-one with the secondary controllers. The primary controller provides read/write access to the remote memory disk units and read/write access to each of the solid-state memory modules through the associated secondary controller.

15 Claims, 5 Drawing Sheets

ONBOARD COMPUTER DATA STORAGE, ACCESS, AND CACHING SYSTEM

BACKGROUND OF THE INVENTION

1. Field of the Invention

The present invention is in the field of computing and pertains particularly to methods for integrating a data storage facility, storage access controller, and in some embodiments a fast data caching system into a single onboard system.

2. Discussion of the State of the Art

In the field of computing, data storage and access remains one of the most important areas of new research. Data storage capacities for single data storage devices are now classed in the terabyte range instead of the gigabyte range.

In a typical computing system random access memory (RAM) is provided for main memory of the system. Main memory is where a computing system stores application data, program data, and other important data frequently accessed by the central processing unit (CPU). A smaller amount of RAM is typically available to the CPU of a computer system and is used for data caching. CPU speeds have increased much more than the speeds at which external data can be stored and accessed.

Mechanical storage disks such as magnetic or optical disks require a read/write head and are slower than more recently developed non-volatile flash-based storage devices. However, reading from and writing to solid-state storage disks, while faster than mechanical disks, is still slower than operating RAM following its true random access characteristic.

While the storage capacity of individual data storage disks have dramatically increased, system developers have not increased cache capacities of computing systems to maintain acceptable or normal ratios of cache available to storage capacity available for a given computing system. The much smaller ratio of cache to available storage capacity may lend to a cache hit ratio or hit rate that is significantly lower when compared to systems with more cache in proportion with storage capacity. Main memory is relatively more expensive to add to a computing system than extra storage space so the tradeoff of more storage capacity but reduced caching capability persists for more robust computing systems.

Architecturally, the closer RAM is to a CPU or processing Chipset the faster it may be accessed and utilized. Many newer computing systems now have some amount of RAM installed directly on the CPU. However, much of the data storage capacity available to these more robust systems is still external and accessible to the host CPU only by cable and a peripheral data storage controller. In systems known to the inventor the controller may be a multi channel storage controller connecting the host to multiple data storage hard disks. The data storage system and the controller for granting computing access to the data storage system are external to the computing host, and the host leverages the storage system through the controller.

Such a data storage controller may be provided as a peripheral component interface (PCI) card that may be installed into an available PCI slot of the computing system. Other peripheral architectures also exist depending on the system and the number of host computers having access to the data storage system. One issue with cabled and networked architecture is latency in reading or writing data, the latency arising from bus contentions, limitations, network bottlenecks and other network problems.

It has occurred to the inventors that if sufficient data storage and access capability could be provided on board a host system, even though it may still use external storage disks, a significant performance increase relative to data reading and writing could result.

Therefore what is clearly needed in the art is an onboard data storage, access and caching solution that may be provided to a host computing system as an installable board or as part of the main board or motherboard of the system. A solution such as this would greatly increase the performance of the system relative to reading and writing data during a computing session.

SUMMARY OF THE INVENTION

The problem stated above is that faster data storage and access speeds are desirable for a computing system, but many of the conventional means for storing and for accessing data, such as mechanical disk systems, or networked data storage systems also create latency. As data storage capacity for robust systems increases cache memory available to the system has not increased in proportion. The inventors therefore considered functional elements of a computing data storage and access system, looking for physical elements that could potentially be harnessed to provide a faster and more efficient architecture for robust computing systems but in a manner that would not add significantly more cost to the system.

Every data storage and access system is driven by a data storage controller accessible to a computing platform and connected by cable to one or more hard disk drives. A by product of such architecture is performance lag in writing and reading data especially when the hard disks are mechanical disks. Most such data storage and access systems employ data storage controllers to manage data storage and data access routines relative to application requests from the running applications of the computing system. Mechanical hard disk drive systems are largely still part of such data storage and access systems.

The present inventor realized in an inventive moment that if, at the accessing computing system or host, data storage controller functions could be integrated with memory controller functions, significant performance acceleration might result. This performance increase might result because of bus and network contention elimination and, of course, may be realized in addition to more obvious performance increases due to storage space and caching space expansions. The inventor therefore devised a unique computing architecture for boosting the performance of a data storage and access system that allowed hot data or frequently accessed data to be cached in a local fast RAM buffer and or in a local solid state cache during a computing session in a manner that minimized the necessity for accessing the data directly from disk storage. Likewise, expanded solid-state data storage is part of the local architecture. A significant performance increase in computing results, with no impediment to processing stability created.

Accordingly, in an embodiment of the present invention, a controller and memory unit for a host computer is provided, comprising a primary controller coupled to a parallel bus interface connectable or connected to the host computer, and by cable connections to one or more remote memory disk units, one or more secondary controllers coupled by parallel bus to the primary controller, and one or more solid-state memory modules coupled by parallel bus one-to-one with the secondary controllers. The primary controller provides read/write access to the remote memory disk units and read/write access to each of the solid-state memory modules through the associated secondary controller.

In one embodiment the controller and memory unit of claim 1 is implemented on a peripheral component interconnect (PCI) card, and in another embodiment is implemented on a motherboard of the host computer. One or more of the remote memory disk units may be a redundant array of independent disks (RAID Array) including hard disks or solid-state disks. Read/write access to the one or more remote memory disk units may be conducted over one or more cables attached to the PCI card by pin connectors bussed to the controller architecture. In some embodiments the memory controller may comprise a Northbridge Southbridge chipset. Also in one embodiment the remote memory disk units may be parallel advanced technology attachment (PATA), or serial advanced technology attachment (SATA), or small computing system interface (SCSI) disks. Further, the solid-state memory modules may be flash-based memory modules, random access memory (RAM) based modules, or a mix of flash and RAM based memory modules.

Also, in some embodiments the one or more secondary controllers may be implemented in code on a digital medium accessible to the controller architecture.

BRIEF DESCRIPTION OF THE DRAWING FIGURES

DETAILED DESCRIPTION

The inventor provides a unique multi-channel data storage controller architecture that controls computing access to one or more remote data storage and to one or more solid-state memory modules mounted to the same board hosting the controller circuitry. The invention may be provided as a peripheral device or as a generic feature of a main computing system circuit board such as a motherboard for example. The invention is described in various embodiments starting with the embodiment of FIG. 1 below.

Figure 1:
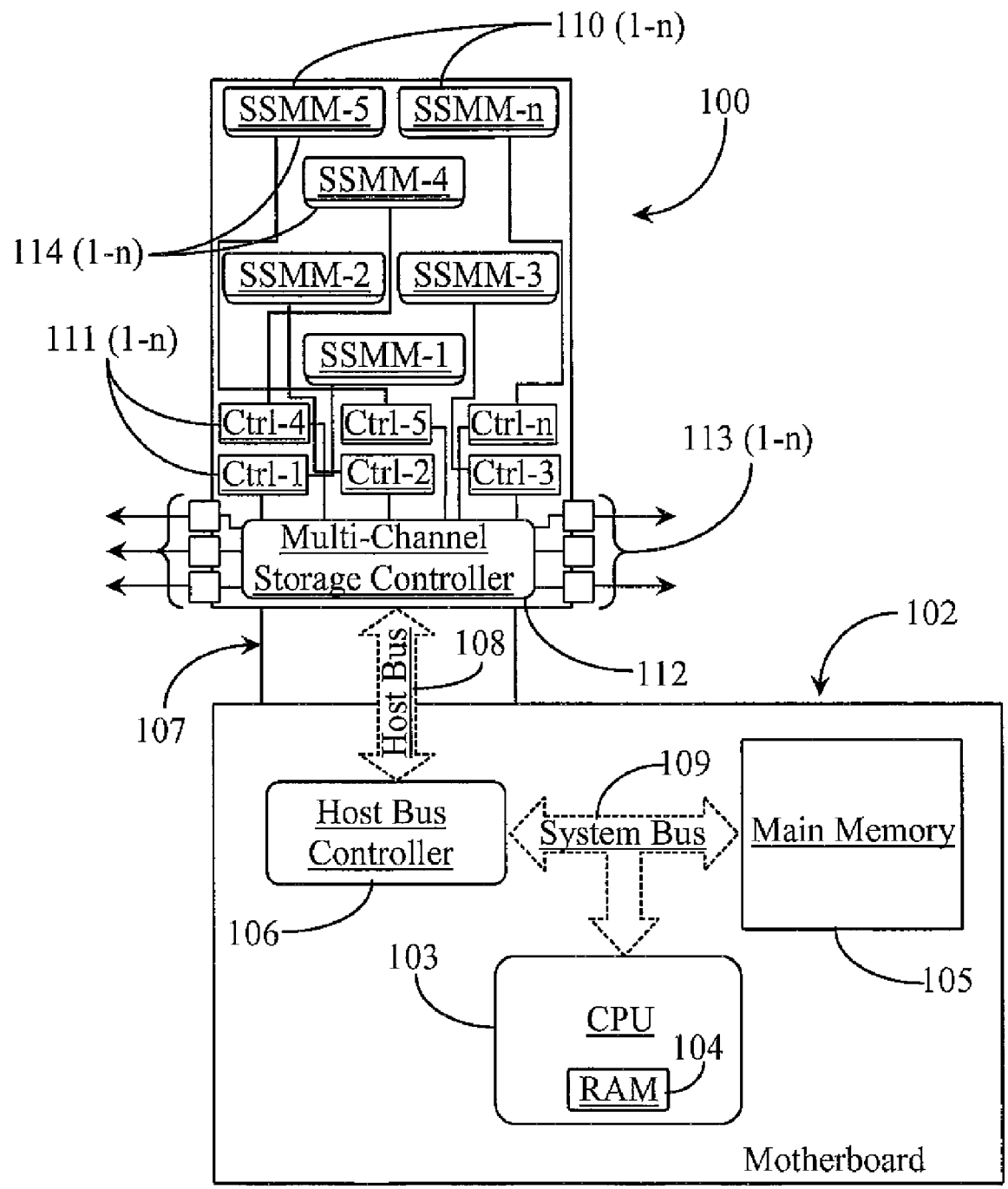
FIG. 1 is a block diagram illustrating a multi-channel data storage and controller card according to an embodiment of the present invention.

FIG. 1 is a block diagram illustrating a multi-channel data storage and controller card 100 according to an embodiment of the present invention. Card 100 is a peripheral computing component in this example and may be a PCI card that is installed into a PCI slot of a host computing system in order to provide data storage and optimized controller features to that computing system.

Card 100 is built onto a PCB that includes a multi-channel data storage controller 112 mounted thereto. Storage controller 112 is adapted to grant CPU read and write access to two different types of data storage elements, one which is remote or off board and one which is onboard and very local. Card 100 has data storage elements 110 (1-n) mounted or otherwise attached thereto. Data storage elements 110 (1-n) are solid-state memory modules (SSMM). Solid-state memory modules 110 1-n are attached to card 100 via memory connectors 114 (1-n). Memory connectors 114 (1-n) may soldered or otherwise permanently attached to card 100 and are adapted to retain a memory module plugged to the pin connector.

Memory modules 110 (1-n) may be a random access memory (RAM)-based or flash-based memory modules or a combination of the two types in one embodiment.

Flash-based memory modules are preferred because of their non-volatile nature. However, non-volatile types of RAM may be used if desired. The amount of solid-state memory that can be provided on card 100 may be in the gigabyte or terabyte range. In this example there are 6 modules but in other embodiments there may be fewer than 6 modules, one module, or more than 6 modules provided on the card. In one embodiment modules may be added or subtracted from the card by plugging or unplugging them from connectors 114 (1-n).

Each SSMM plugged into card 100 has a separate memory controller also provided on the card or in some cases integrated into a main data storage controller as will be seen later in this specification. Each memory controller 111 (1-n) has a bussed connection to a SSMM 110 (1-n) on a one-to-one ratio in this example. Parallel bussing or serial bussing might be used to connect the memory modules to respective memory controllers 111 (1-n). Logical bussing is represented by connected line in this example. For example, controller 111-1 is bussed to SSMM-1, controller 111-2 to SSMM-2 and so on for all of the modules onboard.

Memory controllers 111 (1-n) are in turn bussed to a multi-channel data storage controller 112 mounted to card 100. Storage controller 112 provides computing access to SSMMs 110 (1-n) through individual memory controllers 111 (1-n). Card 100 also has multiple cable connectors 113 (1-n) provided thereon and adapted to accept cables leading to remote data storage disks. Connectors 113 (1-n) are each bussed for communication to data storage controller 112. In this example connectors 113 (1-n) and controllers 111 (1-n) are external to controller 112 but are physically bussed to the controller.

The cables leading to the remote data storage disk system may be high-speed T-1 network cables or data cables or an equivalent thereof. In this example there is one connector and cable per storage disk. Other ratios of connectors and cables to disks could be implemented instead of a one-to-one relationship. The remote disks may be mechanical disk using a magnetic read and write head. The disks of the remote data storage system may also be solid-state storage disks.

The remote data storage system may be separated from a host computing device by a data network such as a local area network (LAN) or a wide area network(WAN) examples of which may include a local Ethernet network, a private or corporate WAN including a segment of the Internet network. The remote data storage system may therefore be a network attached storage (NAS) or a storage area network (SAN) connected system.

In this example, card 100 includes a connector 107 adapted to connect the peripheral device to a host computing device represented herein by a motherboard 102. Card 100 is connected through a slot or bay such as a PCI slot or bay. Motherboard 102 includes a CPU 103, a RAM cache 104, a front side or system bus 109, a main memory 105 and a host bus controller (HBC) 106. HBC 106 communicates with multi-channel storage controller 112 on card 100 through a host bus 108 which may be a PCI bus. In one embodiment SSMMs 110 (1-n) are provided to serve as additional memory above what is found available in the remote data storage system. SSMMs 110 (1-*n*) may be used as additional storage space or as an additional data caching resource.

When card 100 is installed to motherboard 102 via PCI slot as illustrated the host CPU 103 has access to both local SSMMs on the card and remote data storage disks connected by cable to the card and controller. The exact nature of the access parameters for the CPU of the host will depend entirely on configurations made into an interface (not illustrated) that is made available to the host so that a user may configure, for example how much of the additional storage (SSMMs) might be used for added storage space or data cache, or a combination of those. The same interface can be used to reserve an amount of RAM from the CPU or from main memory for creating a fast RAM buffer or data cache such as RAM 104 on CPU 103 for example.

Multi-channel storage controller 112 replaces any previous storage controllers that may have existed before the addition of card 100 to the computing system. That is to say that a system upgrade can be performed for a system connected to a remote data storage array of disks such that the old storage disks are disconnected from the old controller and reconnected to controller 112. Thus connected, the user accessing the data storage disks may pre-configure the nature of access including reserving memory for use as expanded cache, additional data storage and so on as previously described. An interface adapted for that purpose would be accessible on the host computing system having access to the data storage systems. SW or FW running on controller 112 makes determinations about which storage element if any will be used on card 100 for each request coming into the controller 112 from the HBC 106. The architecture presented in this example enables system optimization via expansion of cache and or of additional faster data storage.

Figure 2:
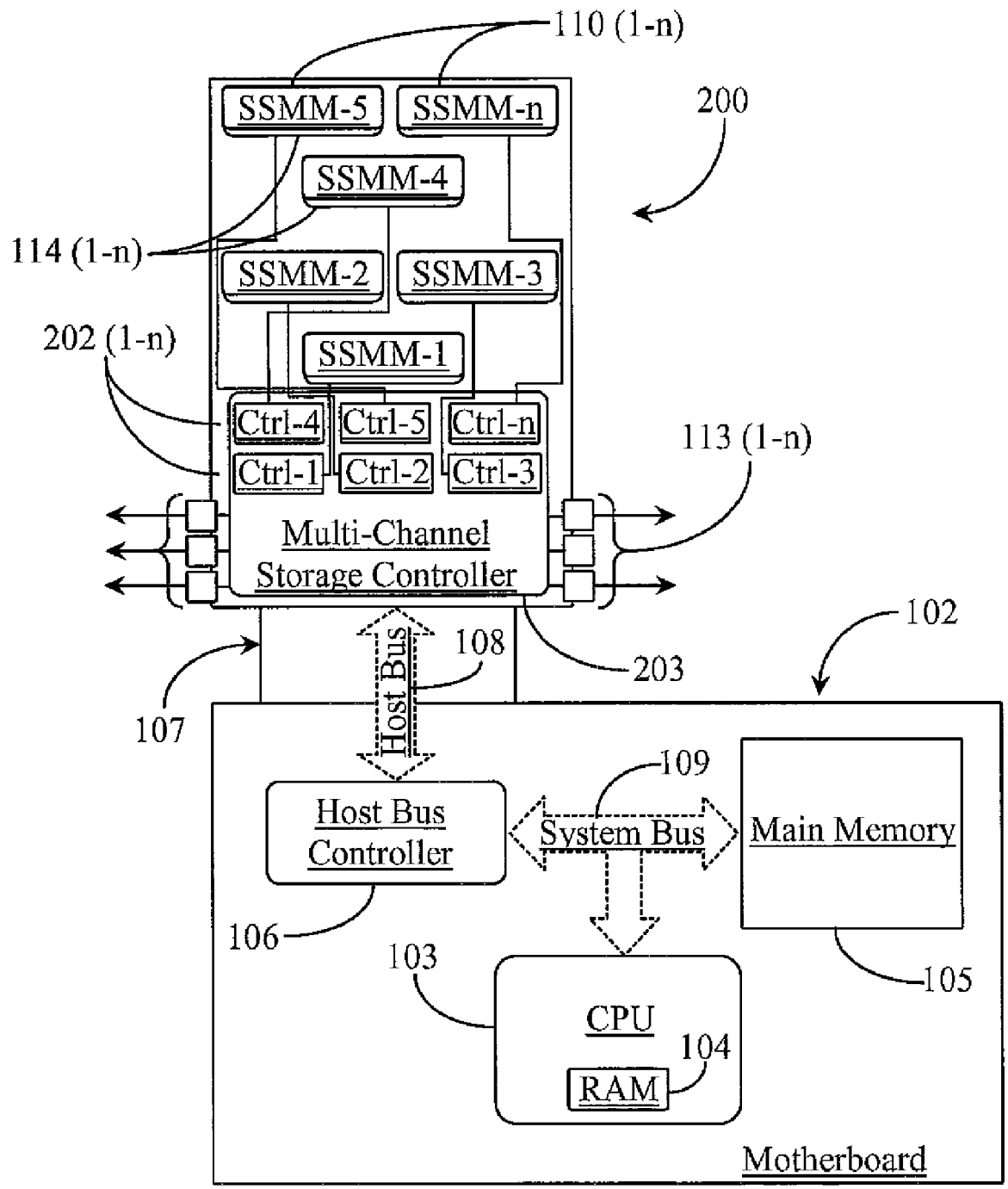
FIG. 2 is a block diagram illustrating a multi-channel data storage and controller card according to another embodiment of the present invention.

FIG. 2 is a block diagram illustrating a multi-channel data storage and controller card 200 according to another embodiment of the present invention. Card 200 is very similar in construction and component features to card 100 described above. Some of the components or features described in this example are the same exact features already introduced and described with respect to FIG. 1. Therefore, such components or features shall not be reintroduced and shall retain the same element number given during introduction of the component or feature.

Card 200 includes SSMMs 110 (1-*n*) plugged into provided connectors (114 (1-*n*) as previously described enabling the onboard solid-state-data storage system. Likewise, connectors 113 (1-*n*) are included in this example and lead to a remote disk storage system as previously described. Card 200 is installed into a slot on the host computer using connector 107 to complete bus 108 for communication between HBC 106 and a modified multi-channel data storage controller 203 that is mounted to card 200. The main difference between system 100 and system 200 is that multi-channel controller 203 has built-in memory controller elements 202 (1-*n*) instead of being bussed to controllers that are mounted to the card separately from the multi-channel controller.

Controllers 202 (1-*n*) may comprise physical channels or "soft" channels (implemented in SW or FW) without departing from the spirit and scope of the present invention. In this example controllers 203 (1-*n*) are physically bussed to SSMMs 114 (1-*n*) on a one-to-one ratio or one memory controller to one memory module.

Figure 3:
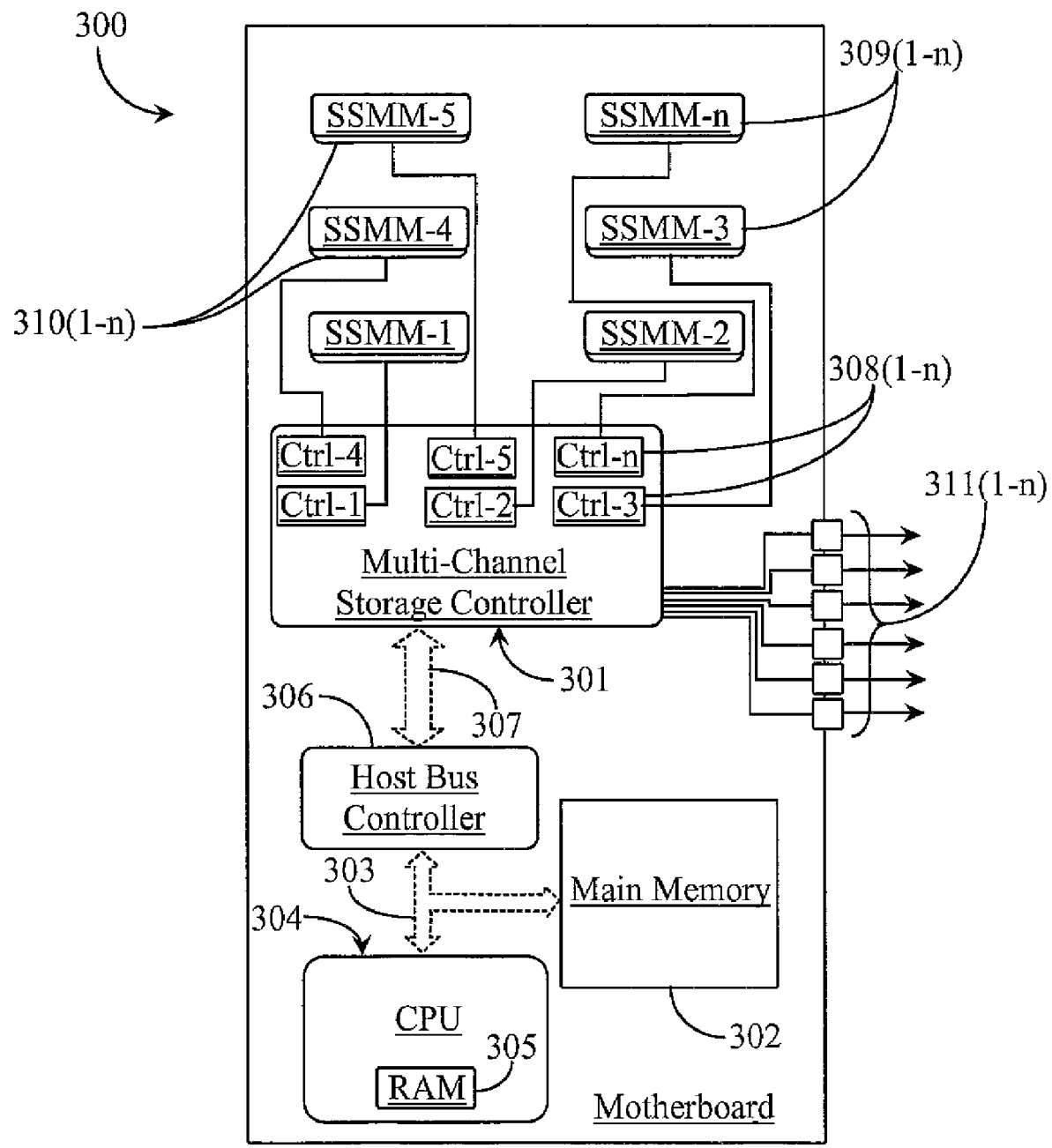
FIG. 3 is a block diagram illustrating a multi-channel data storage and controller motherboard according to another embodiment of the present invention.

FIG. 3 is a block diagram illustrating a multi-channel data storage and controller motherboard 300 according to another embodiment of the present invention. Motherboard 300 is, in this example, the main motherboard of a computing system. A multi-channel storage controller 301 is mounted not to a peripheral card, but to the main motherboard 300 of a computing system.

Motherboard 300 includes SSMMs 309 (1-*n*), which are essentially analogous to SSMMs 110 (1-*n*) accept that they are arranged a little differently of the motherboard then they were on the PCI card. In this case SSMMs 309 (1-*n*) are each plugged into connectors 310 (1-*n*) as is the case in the previous card embodiments. Multi-channel controller 30-1 is also analogous to controller 203 of FIG. 2 accept that it is now mounted directly to the motherboard and bussed directly to a host bus controller (HBC) 306 via host bus 307. The PCI connector architecture is not required in this embodiment and connector 107 shown in FIG. 2 is not required here.

In this example, connectors 311 (1-*n*) are analogous to connectors 113 (1-*n*) accept that in this case they are all attached to one side of the motherboard. Each connector is bussed to multi-channel storage controller 301. In this embodiment the motherboard includes a CPU 304, an amount of RAM 305 on the CPU, a main memory 302, and a HBC 306. A host bus 307 enables HBC 306 to talk to storage controller 301. A front side or system buss 303 connects CPU 304 and main memory 302 to the HBC.

Function of the system hosted on a motherboard in this example is essentially the same as it would be hosted on a peripheral board accept that everything is made more local and some latency is reduced by elimination a PCI adapter or connector. Parallel bussing and/or serial bussing may be used to connect SSMMs 309 (1-*n*) to the multi-channel storage controller. Connectors 311 (1-*n*) all lead to data storage disks that may be connected to the host computing system via cable.

Figure 4:
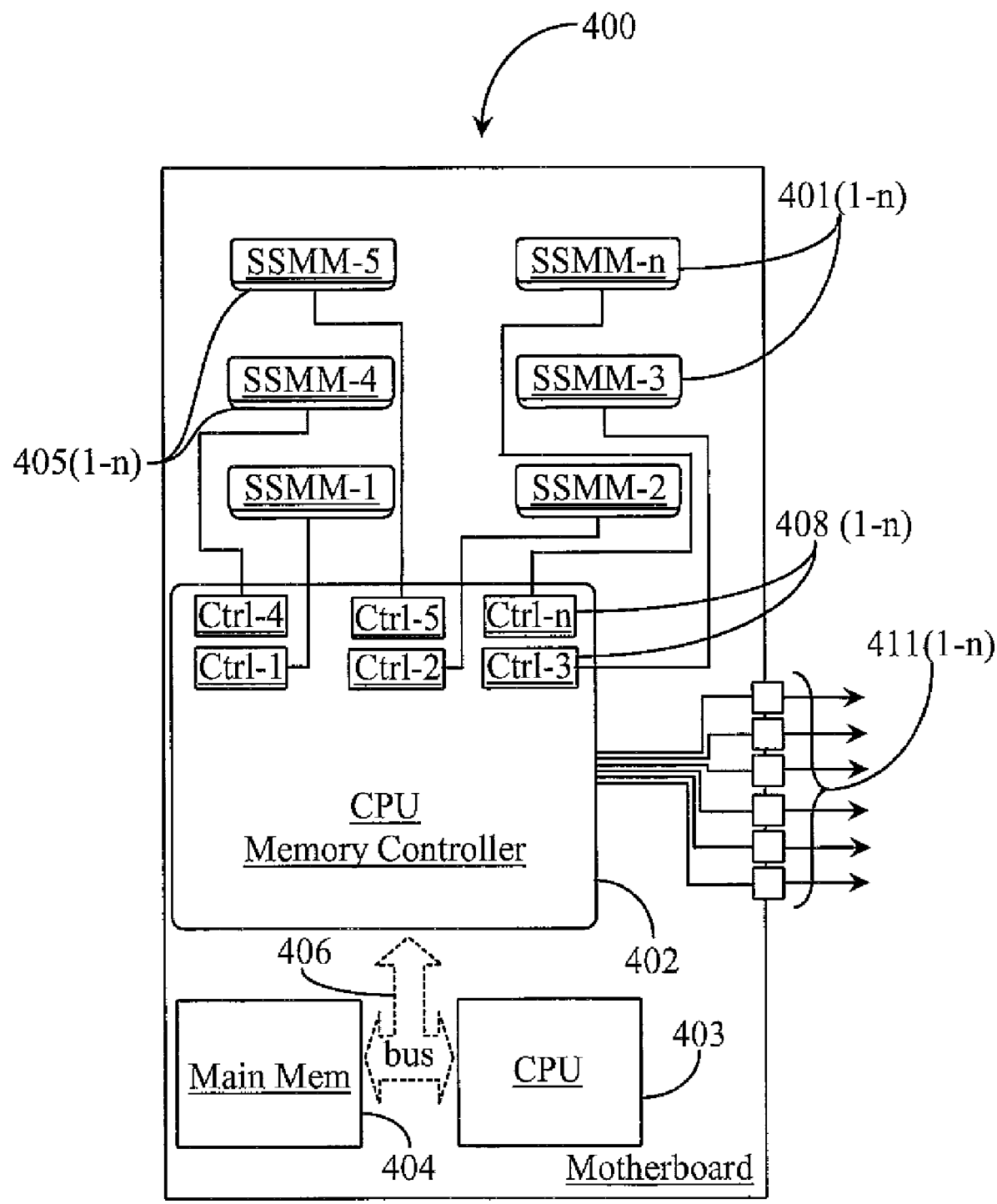
FIG. 4 is a block diagram illustrating a motherboard including a multi-channel data storage and CPU memory controller.

FIG. 4 is a block diagram illustrating a motherboard 400 including a multi-channel data storage and CPU memory controller 402. Motherboard 400 is very similar to motherboard 300 described above accept that in this example a single controller 402 is provided that includes built-in SSMM memory controllers 408 (1-*n*) and a CPU memory controller. A CPU 403 and main memory 404 are provided on motherboard 400 separately from controller 402 but are bussed to the controller and to each other via a front side or system bus 406. SMMMs 401 (1-*n*) are, as before, plugged into connectors 405 (1-*n*), which are bussed to data storage controller 402.

The HBC is no longer required in this example and can be eliminated. Everything happens on the controller in this example. Controller 402 controls access to SSMMs 401 (1-*n*) through controllers 408 (1-*n*). Controller 402 controls access to the CPU and main memory. Controller 402 effectively combines data storage memory controller functions and CPU memory controller functions. Bus 406 provides the communication capability between the modules being chiefly the controller, the CPU, and the main system memory.

Figure 5:
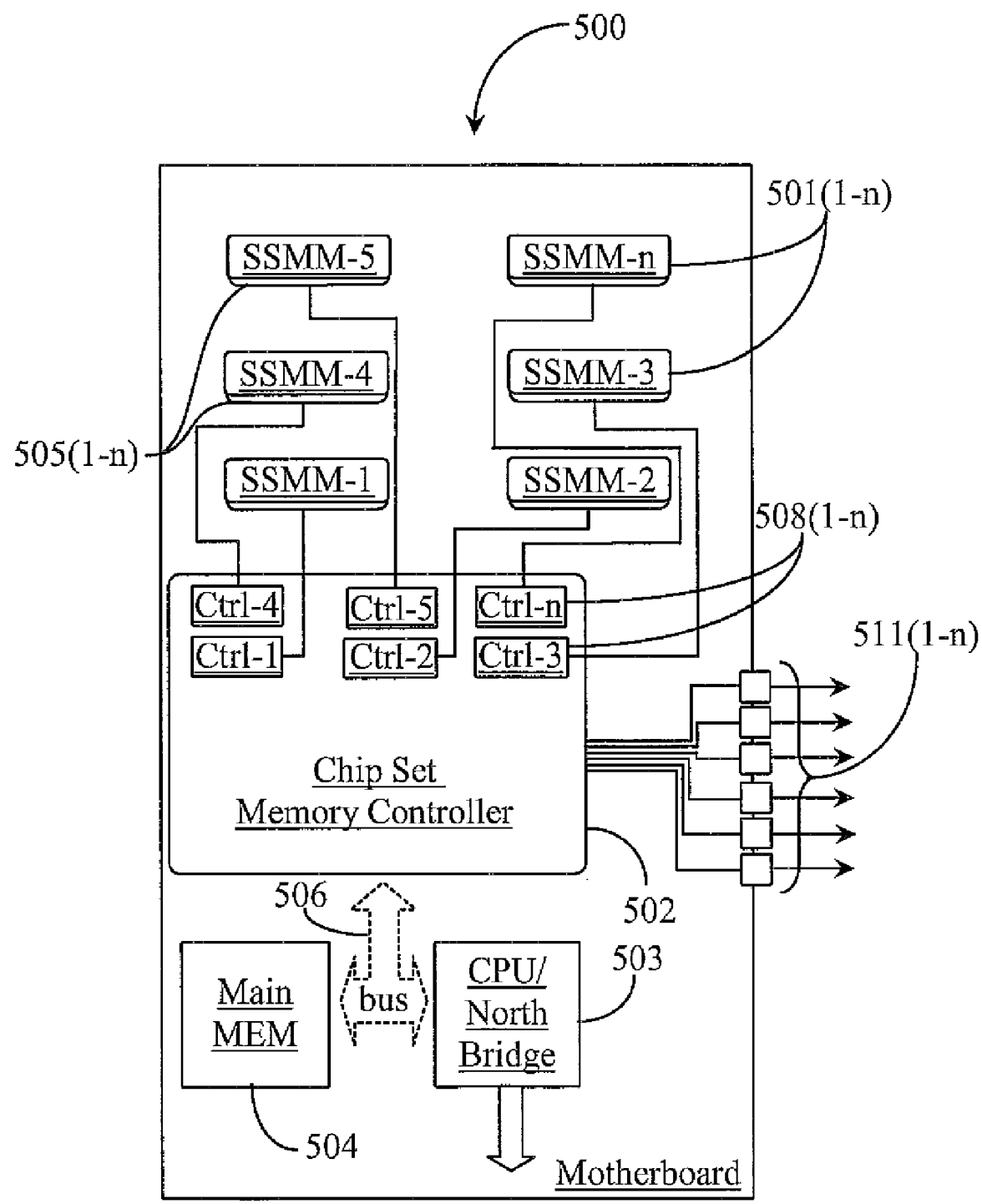
FIG. 5 is a block diagram illustrating a motherboard including a multi-channel data storage and chipset memory controller.

FIG. 5 is a block diagram illustrating a motherboard 500 including a multi-channel data storage and chipset memory controller 502. Motherboard 500 includes SSMMs 501 (1-*n*) analogous to SSMMs 401 (1-*n*) of FIG. 4. The SSMMs fit into connectors 505 (1-*n*) strategically spaced over board 500.

In this example cable connectors 511 (1-*n*) are analogous to cable connectors 411 (1-*n*) of FIG. 4. A CPU/Northbridge chipset 503 is provided wherein the CPU and Northbridge share a same die. In some other embodiments the Northbridge and CPU are mounted separately from one another. The South bridge or the North/South bridge chipset is not illustrated in this example but may assumed present and mounted on the board generally in the direction of the directional arrow emanating from North bridge 503.

Controller 502 controls access to onboard SSMMs 501 (1-*n*) through built-in or embedded controllers 508 (1-*n*). Chipset memory controller 502 also controls access to main memory 504 and CPU 503 via front-side or system bus 506. The embodiments of FIG. 4 and of FIG. 5 present scenarios in which the solution of providing solid-state memory and for reserving available main memory for purposes of creating dedicated storage space, cache memory, or a fast RAM buffer in main memory is supported entirely on one system main board or motherboard with all of the controller functions housed on one device architecture.

One with skill in the art will appreciate that there are a variety of Chipset and CPU architectures that have been utilized on motherboard architectures and that more recent integration, for example, of the memory controller onto the CPU or Northbridge chip and CPU chip (sharing a common die) are just examples of multiple possible variations. The aspect of combining all of the controller functions for memory and "local" solid-state data storage into a single multi-channel controller represents a unique approach in architecture that is relatively inexpensive to implement and can be constructed taking a relatively small footprint on the board.

It will be apparent to one with skill in the art that the onboard data access, storage and caching system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A controller and memory unit for a host computer, comprising:
    a primary controller coupled to a bus interface connectable or connected to the host computer, and by cable connections to one or more remote memory disk units;
    a plurality of secondary controllers, each bussed to the primary controller; and
    a plurality of solid-state memory modules, each bussed separately to a respective corresponding one of the secondary controllers in a one-on-one relationship;
    wherein the primary controller provides read/write access to the remote memory disk units and read/write access to each of the solid-state memory modules through the secondary controller corresponding with its respective memory module.

2. The controller and memory unit of claim 1 implemented on a peripheral component interconnect (PCI) card.

3. The controller and memory unit of claim 1 mounted on a motherboard of the host computer.

4. The controller and memory unit of claim 1 wherein one or more of the remote memory disk units is a redundant array of independent disks (RAID) including hard disks or solid-state disks.

5. The controller and memory unit of claim 2 wherein read/write access to the one or more remote memory disk units is conducted over one or more cables attached to the PCI card by pin connectors bussed to the controller architecture.

6. The controller and memory unit of claim 2 wherein each of the plurality of solid-state memory modules plug into connectors mounted to the PCI card and are bussed to the corresponding secondary controller.

7. The controller and memory unit of claim 3 further comprising:
    a memory controller of a central processing unit (CPU).

8. The controller and memory unit of claim 3 further comprising:
    a memory controller of a Northbridge Southbridge chipset.

9. The controller and memory unit of claim 3 wherein read/write access to the one or more remote memory disk units is conducted over one or more cables attached to the motherboard by pin connectors bussed to the primary controller.

10. The controller and memory unit of claim 3 wherein read/write access to the one or more solid-state memory modules is conducted through the one or more secondary controllers.

11. The controller and memory unit of claim 1 wherein the remote memory disk units are parallel advanced technology attachment (PATA), or serial advanced technology attachment (SATA), or small computing system interface (SCSI) disks.

12. The controller and memory unit of claim 2 wherein the solid-state memory modules are flash-based memory modules, random access memory (RAM) based modules, or a mix of flash and RAM based memory modules.

13. The controller and memory unit of claim 3 wherein the solid-state memory modules are flash-based memory modules, random access memory (RAM) modules, or a mix of flash and RAM modules.

14. The controller and memory unit of claim 2 wherein the secondary controllers are implemented in code on a digital medium accessible to the controller architecture.

15. The controller and memory unit of claim 14 wherein the digital medium is a memory chip connected by bus to the controller and memory unit.

* * * * *